United States Patent [19]

McConnell

[11] Patent Number: 4,506,850
[45] Date of Patent: Mar. 26, 1985

[54] ENGINE INSTALLATION FOR AIRCRAFT

[75] Inventor: Charles H. McConnell, Seattle, Wash.

[73] Assignee: The Boeing Company, Seattle, Wash.

[21] Appl. No.: 455,587

[22] Filed: Jan. 4, 1983

[51] Int. Cl.³ .......................... B64C 3/32; B64D 27/18
[52] U.S. Cl. ...................................... 244/54; 244/207;
 244/55; 244/110 B; 244/130
[58] Field of Search ............. 244/15, 12.1, 207, 53 R,
 244/54, 55, 130, 110 B, 117 R, 123; 60/39.31

[56] References Cited
U.S. PATENT DOCUMENTS

| 2,964,264 | 12/1960 | Multhopp | 244/15 |
| 3,194,515 | 7/1965 | Cohan | 244/54 |
| 3,848,832 | 11/1974 | Stanley et al. | 244/54 |
| 3,920,203 | 11/1975 | Moorehead | 244/110 B |
| 4,005,836 | 2/1977 | Mutch | 244/110 B |
| 4,037,809 | 7/1977 | Legrand | 244/54 |

FOREIGN PATENT DOCUMENTS

| 995036 | 11/1951 | France | 244/130 |
| 308988 | 3/1969 | Sweden | 244/110 B |
| 817507 | 7/1959 | United Kingdom | 244/15 |

*Primary Examiner*—Galen L. Barefoot
*Attorney, Agent, or Firm*—Hughes, Barnard & Cassidy

[57] ABSTRACT

A fan jet engine mounted below and rearwardly of the wing of an aircraft. There are a pair of mounting arms which are connected to and extend rearwardly from the rear spar of the wing and connect to the fan case and the core engine case. The major portion of the cowling structure is mounted to slideways, so that the cowling structure can be moved rearwardly to expose the engine for service and repair. The thrust reverser is mounted to the rear of the cowling.

9 Claims, 11 Drawing Figures

ENGINE INSTALLATION FOR AIRCRAFT

TECHNICAL FIELD

The present invention relates generally to engine installations for aircraft.

BACKGROUND ART

It is quite common in present day aircraft designs to place the engine nacelle below the wing with the inlet of the nacelle being positioned forwardly of the leading edge of the wing. The design of modern, efficient transport aircraft has increasingly led to the use of high-bypass ratio engines which are considerably larger in diameter than equivalent low-bypass engines, but are highly desirable because of their significantly lower fuel consumption and reduced noise level. Because of the practical limits on landing gear length and runway clearance, designers of new jet transport designs increasingly require much closer coupling of these larger engines to the wing than was practiced in the previous generation of transport designs. Such close mounting of the engines presents interrelated problems and has certain shortcomings.

For example, the close coupling of such engines has a tendency to interfere with airflow over the wing, specifically in the landing and takeoff mode where the aircraft is generally operating at a relatively high angle of attack. This results in increased interaction of the engine nacelle and the wing flow fields, which can degrade airplane performance.

Also, in the thrust reverse mode of operation, fan reverse flow must exit forward of the wing to avoid the tendancy for it to lift the airplane, and reversal or blocking of primary flow is discouraged. The struts by which the engine is mounted to the wing must therefore be long and shallow, and accordingly heavy in order to have adequate stiffness. Further, with minimum ground clearance, there is a greater problem with conjestion and particularly re-injection of reverse thrust flow. Thrust reverse must be shut off at fairly high speeds, putting additional burden on the brakes and tires in addition to the burden caused by not reversing primary flow.

Another consideration is to have the cowl of the engine arranged so that there is convenient access to the engine. In many engine designs, access is provided by incorporating hinged panels, access holes, latches, etc., and these can unnecessarily add weight to the engine.

In view of the above, it is an object of the present invention to provide an engine installation which has a desirable balance of features relative to the considerations noted above.

SUMMARY OF THE INVENTION

The engine installation assembly of the present invention is for an aircraft having a wing with upper and lower surfaces, a leading edge, a trailing edge, and a rear main support structure adjacent the trailing edge. This installation comprises an engine which is positioned rearwardly of the wing, with a forwardly facing air inlet positioned to accept airflow passing beneath the wing. In the preferred embodiment, the engine has an air compressing section, a rear turbine section, and an intermediate combustion section, with the air compressing section being positioned rearwardly of the rear main support structure.

The air inlet has a peripheral lip which defines an inlet opening. This lip has an upper lip portion spaced below the lower surface of the wing and an upper inlet surface defining with the wing a passageway leading upwardly and over the engine. Thus, lower velocity boundary layer air from beneath the wing flows into the passageway and over the engine.

There are a pair of mounting arms supported from and extending rearwardly from the rear main support structure on opposite sides of the engine. The support arms connect to and support the engine.

In the preferred form, the engine is a fan jet engine having a fan case and a core engine case. In this configuration, the support arms have mounting members connecting to side portions of the fan case and the side portions of the core case.

The engine has a cowling section comprising inner and outer duct walls defining a generally annular fan duct extending rearwardly from the fan section. The inner and outer duct walls have innerconnecting side strut means defining respective through openings. The mounting arms extend through the openings of the strut means to connect to the engine core case.

Further, there is a pair of slideway means positioned on opposite sides of the cowling section. The cowling section is movably mounted on the slideway means to move from a forward engine operating position rearwardly to an engine access position to provide access to components of the engine.

In the preferred configuration, the cowling has forward wall means extending around the fan case, and the forward wall means moves rearwardly with the cowling section to the engine access position.

The assembly has a thrust reverser mounted to the cowling section and movable rearwardly with the cowling section to the engine access position. In one embodiment, the thrust reverser comprises bucket means having a stowed position adjacent an upper portion of the cowling, and an operating position where the bucket means extend across an outlet of the engine, and defines an upwardly and forwardly extending thrust reversing passage to direct thrust reversing exhaust over the wing.

Other features of the present invention will become apparent from the following detailed description.

DESCRIPTION OF THE PREFERRED EMBODIMENT

Figure 1:
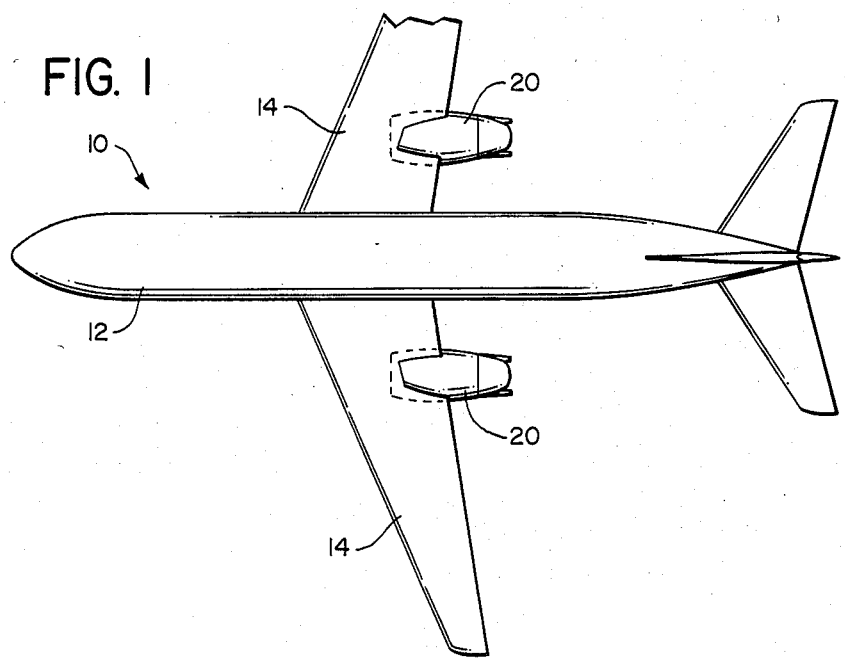
FIG. 1 is a top plan view of an aircraft incorporating the engine installation of the present invention.
Figure 2:
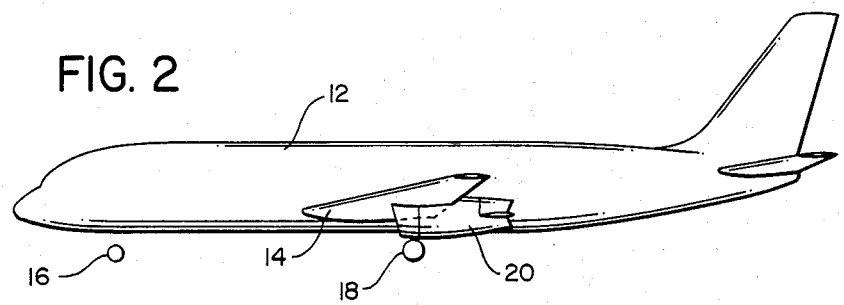
FIG. 2 is a side elevational view of the aircraft of FIG. 1.
Figure 3:
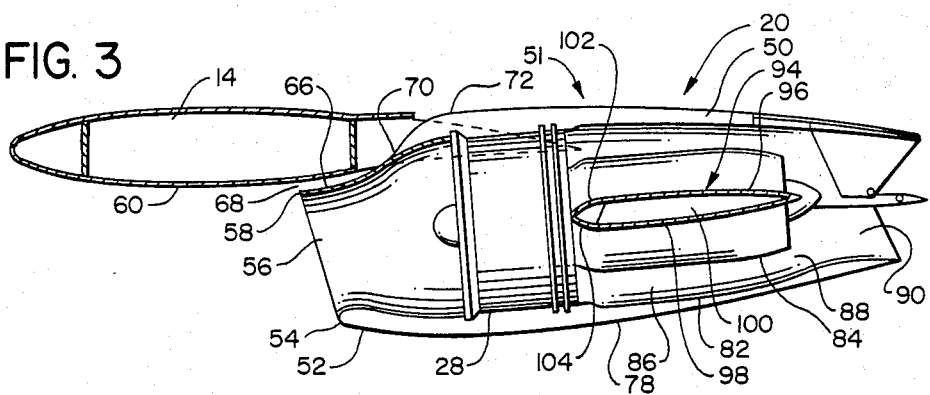
FIG. 3 is a longitudinal sectional view taken through the center line of the engine nacelle, but showing the fan case in its entirety, and with the plane of the sectional view passing in a curve through the fan duct of the engine.
Figure 4:
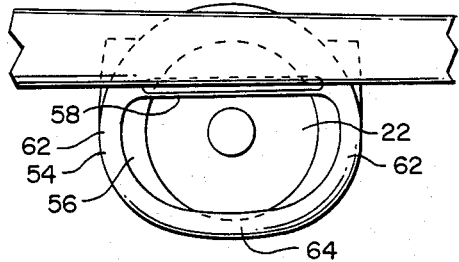
FIG. 4 is a frontal view of the engine installation.

In FIGS. 1 and 2, there is shown an airplane 10 having a fuselage 12, a pair of swept wings 14, and a landing gear comprising a nose wheel 16 and a set of rear wheels 18. The aircraft 10 has right and left jet engines 20 mounted to the rear portions of the right and left wings 14, respectively. The present invention is particularly directed to the mounting and overall installation arrangement of the two engines 20. Since the installation of each engine 20 is substantially identical to the other (except for the reversal of some of the parts because of the right and left positioning), only the left engine 20 will be described herein in detail.

The engine here illustrated and described is capable of mixing fan and primary propulsive exhaust flows, thus permitting a common propulsive exhaust nozzle and reverser installation. It will be understood that a variation of the described embodiment providing for separated fan and exhaust propulsive nozzle with appropriate reversing means is likewise attainable.

The basic operating components of the engine 20 are or may be of conventional design. In this embodiment, the engine 20 is fan jet engine capable of mixed propulsive flow and comprising a fan and compressor section 22, a rear turbine section 24 and an intermediate combustion section 26, but for ease of illustration, only the exterior configuration of these components have been shown. Thus, there is shown a fan case 28 and the core engine case 30, it being understood that the components contained therein are, as indicated above, conventional. Conventional trailing edge flaps 31 are positioned on opposite sides of each engine 20.

The engine 20 is mounted by means of two main mounting arms 32 positioned on opposite sides of the engine 20. Each arm 32 is mounted by its forward end 34 to the rear spar 36 of the wing 14. Each arm 32 has a main section 38 which extends rearwardly with a moderate downward slope along a related side of the fan case 28. This main section 38 of each arm 32 has a main support member 40 which connects to the related rear side portion of the fan case 28 or to the core case depending on engine mounting requirements. The two support members 40 provide the main support for the engine 20 and withstand the thrust loads, torsional loads and radial expansion and contraction generated during the operation of the engine 20. Also, there is a pair of structural braces 41 extending from the rear rearwardly and divergently to connect to the arm sections 38.

Figure 5:
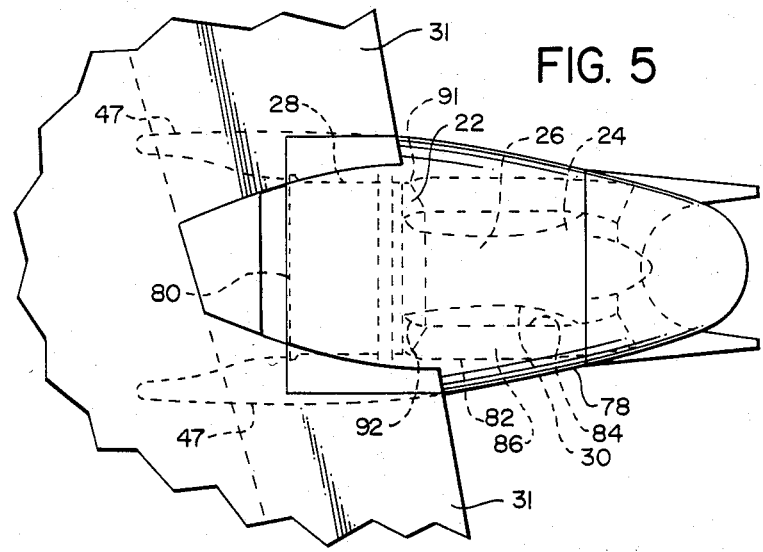
FIG. 5 is a top plan view of the engine installation.
Figure 6:
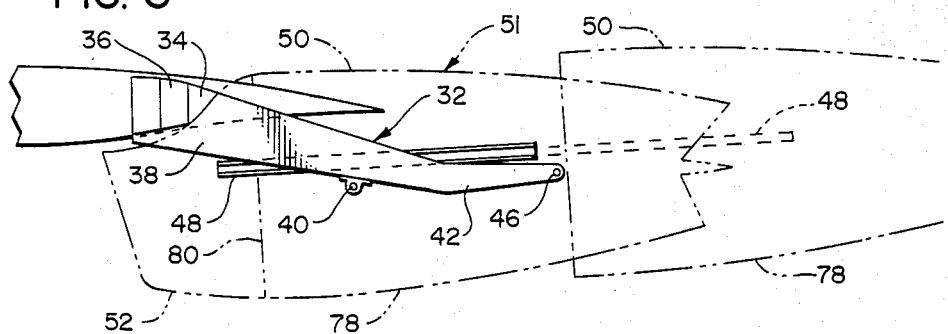
FIG. 6 is a side elevational view of the mounting arms and slideway of the present invention, with the engine cowling being shown in broken lines in its forward position and also in its rear position.
Figure 7:
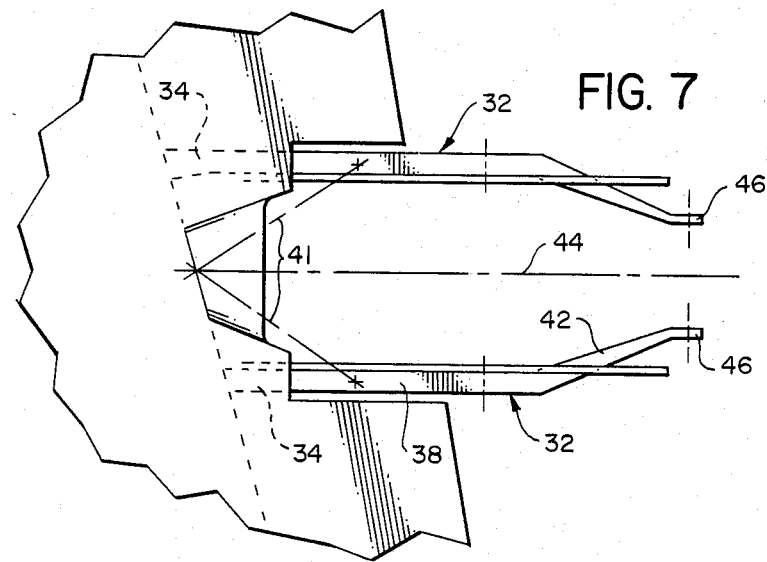
FIG. 7 is a top plan view showing only the mounting arms and the slideway, with the engine operating components and cowling being removed for purposes of illustration.

Each arm 32 also has a rear section 42 which extends rearwardly and slants radially inwardly toward the center line 44 of the engine 20. At the aft end of each of the rear sections 42 there is a rear support member 46 which attaches to a related side of the core engine case 30. The attachment of the rear support member 46 is such as to permit moderate relative movement of the adjacent portion of the core engine case 30 so as to allow for radial and longitudinal expansion and contraction of the engine 20 during operation. Thus, the two rear support members 46 primarily serve the function of supporting the weight of the rear portion of the engine 20. The arms 32 are contained in a suitable fairing structure, indicated at 47 in FIG. 5.

Also, each mounting arm 32 has fixedly attached thereto a longitudinally aligned, extendable slideway 48. Each slideway 48 is attached to the inside surface of the main section 38 of its related arm 32, and extends rearwardly over its related rear arm section 42. As will be disclosed more fully here and after, the two slideways 48 permit the cowling 50 to translate rearwardly to make the engine 20 accessible for servicing, engine replacement, replacement of components, etc.

The engine 20 has a nacelle 51 made up of the movable cowling section 50 and an inlet section 52 having a forward peripheral inlet lip 54, defining the inlet opening 56. This lip 54 has an upper lip portion 58 having a general straight line configuration and positioned a moderate distance below the lower surface 60 of the wing 14. The lip 54 has two side portions 62 which extend downwardly from the ends of the upper lip portion 58 and curve into the lower portion 64 of the lip 54. The upper surface 66 of the inlet section 52 is spaced a moderate distance downwardly of the wing lower surface 60 to define therebetween a slot 68 which receives the lower velocity boundary layer air passing beneath the wing lower surface 60. The upper surface 66 of the inlet section 52 slants from the slot 68 upwardly and rearwardly, as at 70, and then makes a convex curve to blend into the main upper surface 72 of the nacelle 51. The actual inlet geometry will be determined by specific engine requirements. With the lower velocity boundary layer air passing into the slot 68, the main airflow into the engine inlet opening 56 is higher velocity air, thus enhancing the operation of the engine 20.

The aforementioned cowling 50 makes up the major portion of the nacelle 51 and is mounted to the extendable portions of the slidways 48. The cowling 50 comprises an outer circumferential wall 78 which has a forward circumferential edge 80 which abuts against a rear edge of the inlet section 52 at the location of the forward end of the fan case 28. Also, the cowling has positioned within the circumferential wall 78 outer and inner walls 82 and 84, respectively, which define the generally annular fan duct passage 86. The fan duct terminates at the rear edge of the inner wall 84 and the outer wall 82 continues, and is restricted to form the combined primary and fan nozzle 90. The forward edge 91 of the outer duct wall 82 butts against the rear edge of the fan case 28. In like manner, the forward edge of the inner wall 84 butts against an annular wall section 92 which is mounted in the fan case 28 and defines the inner surface of the entry portion of the fan duct passage 86.

The two fan duct walls 82 and 84 are interconnected by two diametrically opposed struts 94 extending outwardly and laterally from opposite sides of the inner wall 84 to join to the outer wall 82. Each strut 94 has an upper wall 96 and a lower wall 98 which define a related through opening 100 to receive the rear section 42 of its related mounting arm 32. The upper and lower walls 96 and 98 terminate along a front edge portion 102 and butt up against the rear edge of a strut nose section 104 which is attached to the structure of the fan case 28.

The strut nose section 104 and the walls 96 and 98 are aerodynamically contoured to minimize any disturbance to the flow through the fan duct 86. Also, this opening 100 provides a passageway for supplying the engine with fuel, for providing for the flow of bleed air, and other functions associated with the engine's operation.

Figure 8:
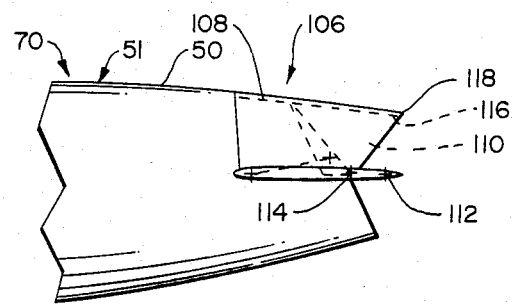
FIg. 8 is a side elevational view of the rear part of the cowling alone, showing the thrust reverser somewhat schematically in its stowed position.
Figure 9:
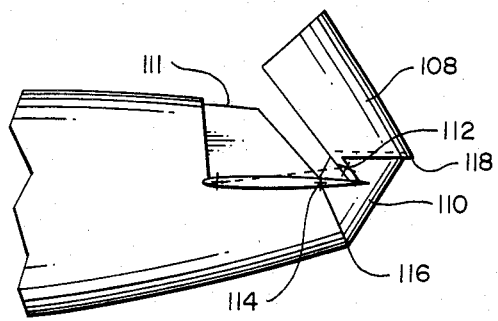
FIG. 9 is a view similar to FIG. 8, showing the thrust reverser in its thrust reversing position.

Mounted to the rear end of the cowling is a thrust reverser 106 which is shown somewhat schematically in FIGS. 8 and 9. This comprises a first bucket section 108 and a second bucket section 110. In the stowed position of FIG. 8, the first bucket section 108 is positioned around a rear portion 111 of the outer cowling wall 78, this portion 111 being stepped radially inwardly a short distance so that the bucket 108 is a rearward extension of the upper half of the outer cowling wall 78. The second bucket section 110 fits within the inside surface of the first bucket section 108 and forms the upper portion of the normal propulsion nozzle. The first section 108 is pivotally mounted at two side locations 112, and the second bucket section 110 is pivotally mounted at two other side locations 114 positioned a short distance forwardly of the pivot locations 112.

Suitable actuating means (e.g. hydraulic cylinders) are arranged to move the bucket sections 108 and 110 about their respective pivot points 112 and 114 to a deployed position shown in FIG. 9. In that position, the rear edge 116 of the second bucket section 112 fits against the lower rear edge portion of the lower part of the cowling outer wall 78, and the bucket section 110 slants upwardly and rearwardly. The rear end 118 of the first bucket section 108 fits against the upper edge of the second bucket section 110, and the first bucket section 108 extends upwardly and forwardly, forming a suitable nozzle. Thus, in the thrust reversing position of FIG. 9, the turbine exhaust and the fan air are diverted by the two bucket sections 108 and 110 in an upward and forward direction over the upper surface of the wing 14.

Figure 10:
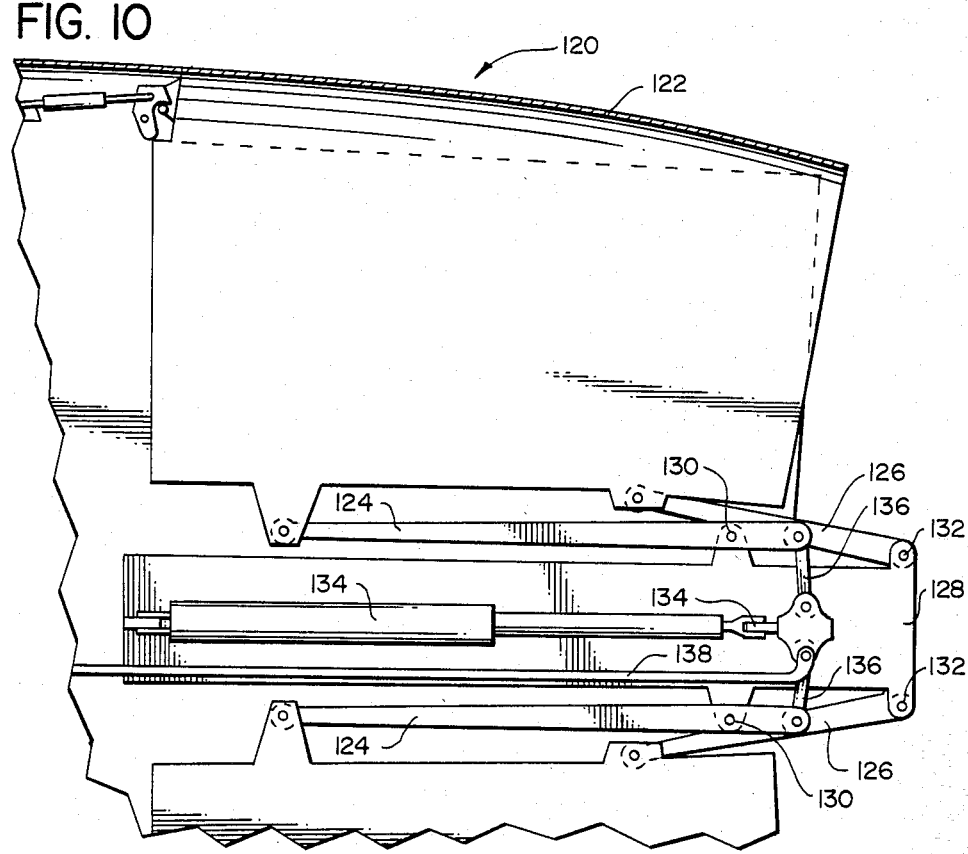
FIG. 10 is a view of a second embodiment of a thrust reverser for the present invention, with the thrust reverser being shown in its stowed position.
Figure 11:
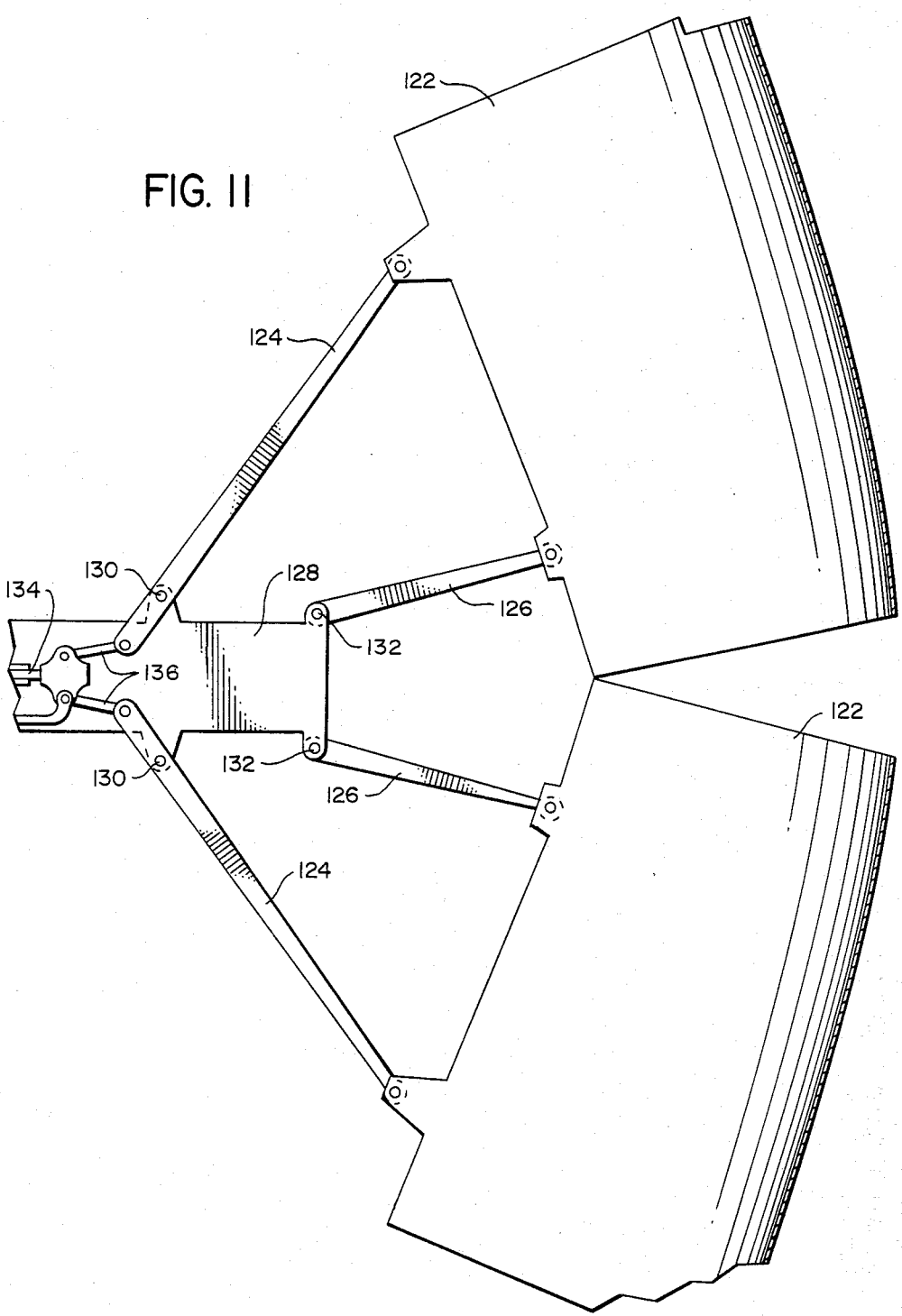
FIG. 11 is a view similar to FIG. 10, but showing both bucket sections of the thrust reverser in the thrust reversing position.

An alternate embodiment of a thrust reverser suitable in the present invention is indicated in FIGS. 10 and 11 at 120. Since a thrust reverser of this type is already in use in the Boeing 737 airplane, and is thus well known in the prior art, it will be described only briefly herein. This thrust reverser comprises two substantially identical bucket sections 122, having at each side a pair of mounting arms, namely a forward arm 124 and a rear arm 126 mounted to a side support structure 128 at respective pivot locations 130 and 132. The two sets of arms 124 and 126 on each side are operated by a related hydraulic actuator 134. As can be seen in FIGS. 10 and 11, retraction of the actuator 134 acts through a linkage 136 to swing the arms 124 and 126 to the position of FIG. 11. A suitable extendable hydraulic supply line 138 is provided to power the actuator 134.

To comment generally on some of the more significant functional features of the present invention, it will be noted that the engine 20 is supported entirely from the two arms 32 and the braces 41. The engine 20 is mounted at side locations to the two main support members 40 and the two rear support members 46. The rear support members 46 permit limited relative movement to accommodate tolerances and thermal effects on engine length. The fan and compressor section 22 is positioned rearwardly of the rear spar 36, with the top of the fan case 28 being positioned above the lower surface of the wing. As shown, it is at about the same waterline as the middle portion of the rear spar 36.

The inlet opening 56 is made noncircular, with the upper lip portion 58 being positioned, as indicated previously herein, to form the slot 68 to receive the lower velocity boundary layer air immediately adjacent the lower surface 60 of the wing 14. This boundary layer air is discharged over the top surface 72 of the engine 20.

The cowling section 50 and the thrust reverser 106 (or in the alternate embodiment, the thrust reverser 120) are basically a single assembly. With the cowling walls 78, 82 and 84 all being connected to one another as a unitary structure, the entire cowling assembly 50 (including the thrust reverser) can be moved rearwardly on the telescoping extendable slideways 48. This alleviates any necessity to form the various cowling walls with hinged panels, access holes, latches, etc. Also, this arrangement makes maintenance access easy and quick.

The inlet section 52 and the cowling 50 are connected by suitable latches in a conventional manner at their area of interface at the forward edge 80 of the circumferential wall 78.

It is to be understood that various modifications could be made without departing from the basic teachings of the present invention.

I claim:

1. An engine installation assembly having a wing with a leading edge, a trailing edge, and upper aerodynamic surface, and lower aerodynamic surface extending from the leading edge to the trailing edge, and a rear main support structure adjacent said trailing edge, said assembly comprising:
   a. a jet engine having a forward air compressing section, a rear turbine section, and an intermediate combustion section, said engine being positioned with the air compressing section located rearwardly of the rear main support structure of the wing,
   b. a pair of mounting arms supported from, and extending rearwardly from, the rear main support structure on opposite sides of the engine, said mounting arms connecting to and supporting said engine,
   c. a cowling structure surrounding said engine and having an exterior surface exposed to free stream air,
   d. a primary air inlet section to receive free stream air and direct the air to the compressor section, said inlet section having a forward peripheral lip defining a main inlet opening of the inlet, said lip having an upper lip portion spaced downwardly from the lower aerodynamic surface of the wing,
   e. said inlet section and said cowling structure having an aerodynamically contoured upper forward surface portion spaced downwardly from the lower aerodynamic surface of the wing and defining with the lower surface of the wing a slot which extends between said mounting arms and which receives lower velocity boundary layer air adjacent the lower wing surface and directs that air over and upper exterior surface portion of said cowling structure.

2. The assembly as recited in claim 1, wherein said engine is a fan jet engine having a forward fan section with a fan case and a core engine case, said primary air inlet section being positioned to direct free stream air through said main inlet opening to the fan section, said mounting arms having connecting members connecting to side portions of said fan case and to side portions of said core engine case.

3. The assembly as recited in claim 2, wherein said cowling structure further comprises inner and outer duct walls defining a generally annular fan duct extending rearwardly from said fan section, said inner and outer duct walls having interconnecting side strut means defining respective through openings, said mounting arms extending rearwardly and then through the openings of said side struts to connect to said core engine case.

4. The assembly as recited in claim 3, further comprising a pair of slideway means positioned on opposite sides of said cowling structure, said cowling structure being moveably mounted on said slideway means to move from a forward engine operating position rearwardly to an engine access position to provide access to components of said engine.

5. The assembly as recited in claim 4, wherein said cowling structure has a forward outer wall means which extends around said fan case, said outer duct wall having a forward end adjacent to and extending rearwardly from said fan case, said side strut means each having open forward portions positioned adjacent to a stationary forward strut portion, said inner and outer duct walls and said side strut means being moveable as a unit on said slideway rearwardly.

6. The assembly as recited in claim 5, wherein said assembly comprises a thrust reverser mounted to said cowling structure and moveable rearwardly with said cowling structure to said engine access position.

7. The assembly as recited in claim 3, wherein said assembly comprises a thrust reverser mounted to said cowling structure and moveable rearwardly with said cowling structure to said engine access position.

8. The assembly as recited in claim 1, wherein said upper lip portion extends substantially horizontally below the lower surface of the wing, so that said slot is a substantially horizontally extending slot.

9. The assembly as recited in claim 8, wherein the aerodynamically contoured upper forward surface portion of the inlet section and the cowling structure extends from the upper inlet lip rearwardly and then in an upwardly and rearwardly extending convex curve.

* * * * *